(12) United States Patent
Yuan et al.

(10) Patent No.: US 8,426,514 B2
(45) Date of Patent: Apr. 23, 2013

(54) ACRYLIC BASED PRESSURE SENSITIVE ADHESIVE FORMULATION

(75) Inventors: Bing Yuan, York, PA (US); Benjamin Wagner, Red Lion, PA (US)

(73) Assignee: Adhesives Research, Inc., Glen Rock, PA (US)

( * ) Notice: Subject to any disclaimer, the term of this patent is extended or adjusted under 35 U.S.C. 154(b) by 198 days.

(21) Appl. No.: 12/942,202

(22) Filed: Nov. 9, 2010

(65) Prior Publication Data

US 2011/0111240 A1    May 12, 2011

Related U.S. Application Data

(60) Provisional application No. 61/260,187, filed on Nov. 11, 2009.

(51) Int. Cl.
*C08F 220/32* (2006.01)
*C08F 220/10* (2006.01)
*C08L 71/02* (2006.01)

(52) U.S. Cl.
USPC ............................ 524/556; 524/245; 526/273

(58) Field of Classification Search .................. 524/556, 524/245; 526/273
See application file for complete search history.

(56) References Cited

U.S. PATENT DOCUMENTS

| | | | | |
|---|---|---|---|---|
| 5,648,425 | A | * | 7/1997 | Everaerts et al. ............. 525/100 |
| 5,886,071 | A | * | 3/1999 | Hariharan ...................... 523/456 |
| 6,198,017 | B1 | | 3/2001 | Basedow et al. |
| 6,518,343 | B1 | * | 2/2003 | Lucast et al. .................. 524/276 |
| 6,566,466 | B1 | | 5/2003 | Zajaczkowski |
| 7,056,526 | B2 | | 6/2006 | Kuroda et al. |
| 7,396,868 | B2 | * | 7/2008 | Tosaki et al. .................. 524/377 |
| 7,465,493 | B2 | * | 12/2008 | Lu ........................... 428/355 AC |
| 2005/0075444 | A1 | | 4/2005 | Tosaki et al. |
| 2006/0035076 | A1 | | 2/2006 | Kim et al. |

FOREIGN PATENT DOCUMENTS

| | | |
|---|---|---|
| DE | 4432368 A1 | 3/1996 |
| EP | 0413301 A1 | 2/1991 |
| JP | 8120249 A | 11/2006 |
| JP | 2007031672 A | 2/2007 |
| JP | 2008260824 A | 10/2008 |
| JP | 2009280776 A | 12/2009 |

* cited by examiner

*Primary Examiner* — Satya Sastri
(74) *Attorney, Agent, or Firm* — McNees Wallace & Nurick LLC

(57) ABSTRACT

An adhesive formulation is disclosed that includes (a) a pre-polymerized cross-linkable non-water soluble acrylic based pressure sensitive adhesive, (b) a cross-linking agent selected from the group consisting of metal chelates, silanes, epoxy-functional compounds, aziridine compounds, multifunctional amines, alkyl halide compounds, multifunctional acids, multifunctional mercaptans, multifunctional epoxy compounds, polyols in the presence of a catalyst, and combinations thereof and (c) a polyol having a weight average molecular weight in the range from 1,000 g/mol to 10,000 g/mol. When cured, the adhesive formulation is self-wetting and has a peel strength less than 20 oz/in.

17 Claims, No Drawings

ACRYLIC BASED PRESSURE SENSITIVE ADHESIVE FORMULATION

CROSS-REFERENCE TO RELATED APPLICATIONS

This application claims priority to U.S. Application No. 60/260,187 filed Nov. 11, 2009, which is hereby incorporated by reference in its entirety.

FIELD

The present disclosure is directed to acrylic based pressure sensitive adhesive formulations and more particularly to self-wetting adhesive formulations and their use in various applications.

BACKGROUND

Pressure sensitive adhesives may be used for accomplishing a bond between two articles without the use of solvent, water, and/or heat to activate the adhesive. Applications in which a pressure sensitive adhesive (PSA) may be advantageous include coatings which are sometimes used, for example, in conjunction with protective coverings for electronic screens such as mobile phone screens or LCD monitor screens.

Many current adhesive formulations for use in such applications are silicone based or, if acrylic based, include an isocyanate cross-linking agent that effectively limits the acrylic base to hydroxyl functional acrylics. The use of isocyanates as cross-linking agents has numerous other drawbacks. In addition to restricting the types of acrylic base that can be used, isocyanates have a level of toxicity and can be expensive. Some isocyanates also have some level of coloration that makes them undesirable for use in screen coverings.

Isocyanates, when used as crosslinking agents, also suffer from the drawback that they lack stability at ambient conditions. As a result, current adhesive formulations employing these compounds as cross-linkers are not mixed together until shortly before use, typically leading to an extra processing step onsite at the manufacturing facility where the adhesive is to be applied.

These and other drawbacks are present in current adhesive formulations.

SUMMARY

According to one embodiment, an adhesive formulation is disclosed. The formulation comprises a pre-polymerized cross-linkable non-water soluble acrylic based pressure sensitive adhesive, a cross-linking agent selected from the group consisting of metal chelates, silanes, epoxy-functional compounds, aziridine compounds, multifunctional amines, alkyl halide compounds, multifunctional acids, multifunctional mercaptans, multifunctional epoxy compounds, and combinations thereof, and a polyol having a weight average molecular weight in the range from 1,000 g/mol to 10,000 g/mol. The adhesive formulation, when cured, is self-wetting and has a peel strength less than 20 oz/in.

According to another embodiment, an adhesive formulation is provided having less than an effective amount of isocyanate and the polyol is a polyether polyol.

An advantage of exemplary embodiments is that the presence of isocyanates can be minimized or eliminated, thereby providing formulations that can result in a longer work life, lower toxicity, and better environmental qualities.

Another advantage is that exemplary embodiments can in some cases be manufactured at a lower cost and can also be made as a shelf-stable ready-to-use formulation that does not depend on on-site mixing, all while still exhibiting good removability and self wetting characteristics for use with protective coverings for display screens and other devices.

Formulations in accordance with exemplary embodiments also expand the types of acrylic polymers that can be used as the base, including the use of functional acrylics in addition to hydroxyl functional acrylics.

These and other advantages will be apparent from the following more detailed description of exemplary embodiments.

DETAILED DESCRIPTION OF EXEMPLARY EMBODIMENTS

According to exemplary embodiments, an adhesive formulation is provided that does not require the presence of isocyanate and which is not limited to hydroxyl functional acrylics as the acrylic PSA base component. Thus, adhesive formulations are provided that can reduce or preferably eliminate the use of isocyanates as cross-linking agents. Exemplary embodiments thus provide formulations that can result in a longer work life, lower toxicity, better environmental qualities, a lower cost and/or a ready-to-use formulation, while exhibiting good removability and a self wetting-ability on display screens and other devices and also expanding the types of acrylic polymers that can be used as the base. Pot life may be up to 1 year, including up to 3 months when an epoxy and/or a silane crosslinker is used.

Formulations in accordance with exemplary embodiments are such that, when cured, they exhibit low peel strength as well as characteristics of being what is sometimes referred to as self-wetting. By "self-wetting" is meant that the cured adhesive formulation exhibits spontaneous wetting out on a smooth surface to which it is applied with little or no external pressure. An additional characteristic of a self-wetting adhesive formulation is that the cured adhesive is removable with little or no residue remaining on the surface to which it had been applied. The peel strength of the cured formulation is less than about 20 oz/in. and in some cases less than about 10 oz/in.

Thus, exemplary formulations can also easily be removed, so that when used for screen protection for example, a film covering can be removed, should a consumer desire to do so or if other circumstances warrant, without damaging the screen or leaving behind a residue. Exemplary formulations also exhibit a low peel strength upon curing resulting an adhesive that is easily removable.

All of the foregoing can be achieved using exemplary embodiments and without the use of isocyanate compounds which may be in less than an effective amount and in some embodiments are excluded entirely.

Exemplary formulations comprise a pre-polymerized crosslinkable acrylic based PSA component, a crosslinking agent, and a polyol.

The cross-linkable PSA component is a non-water soluble acrylic based PSA and may contain carboxyl, hydroxyl or epoxy functional groups or any combination of such functional groups. The PSA may also contain amine and/or acid functionality.

According to one embodiment, the cross-linkable PSA component is a co-polymer containing at least one monomer from a first group consisting of hydroxylethyl acrylate, hydroxylethyl methacrylate, glycidyl methacrylate, acrylic acid and methacrylic acid and containing at least one monomer from a second group consisting of 2-ethylhexyl (meth) acrylate, butyl (meth)acrylate, ethyl (meth)acrylate, methyl (meth)acrylate, isooctyl (meth)acrylate, vinyl acetate, and vinyl pyrrolidone, in which "(meth)acrylate" is meant that either or both the acrylate and methacrylate versions of the monomer may be used. It will be appreciated that more than one type of monomer from each group may be incorporated into the polymer.

The monomers of the PSA component are typically polymerized by free-radical polymerization in the presence of a solvent, the PSA component being pre-polymerized prior to being combined with the cross-linking agent and polyol. Any suitable free radical initiator may be used; exemplary initiators include, but are not limited to, peroxy and/or azo compounds. In a similar fashion, any suitable non-aqueous solvent for use with acrylic polymers may be used and can include ethyl acetate; toluene; hydrocarbons such as heptane or hexane; alcohols; and combinations thereof, all by way of example only. In one embodiment, the solid content of the PSA component is about 33% by weight to about 38% by weight and the solution has a viscosity in the range of about 15,000 to about 40,000 cps. The molecular weight (weight average) of the resulting polymer may range from about 200,000 g/mol to about 800,000 g/mol.

Suitable crosslinking agents for use with exemplary embodiments include metal chelates, silanes, epoxy-functional compounds, aziridine compounds, multifunctional amines, alkyl halide compounds, multifunctional acids, multifunctional mercaptans, multifunctional epoxy compounds, and combinations thereof. Exemplary metal chelates include organic titanates (e.g. TYZOR available from DuPont), as well as metal salts, such as metal acetylacetonate in which the metal is Al, Fe, Zr, or Ti.

In embodiments in which the acrylic PSA is formulated with an acid functionality, cross-linking agents preferably include metal chelates, silanes, epoxy-functional compounds, aziridine compounds, multifunctional amines, and/or alkyl halide compounds. In embodiments in which the acrylic PSA does not contain an acid functionality, the cross-linking agents preferably include multifunctional amines, multifunctional acids, multifunctional mercaptans, and multifunctional epoxy compounds. A polyol may also be used as a crosslinking agent in the presence of a catalyst.

Cross-linking agents such as metal chelates and epoxy compounds result in crosslinking reactions that occur quickly and which can be completed during the coating process or soon thereafter, in contrast to current isocyanate crosslinked formulations that may take up to a week or more to fully cure. The cross-linking agent is typically added as a separate component, although the PSA may be self-crosslinking, with cross-linkable moieties incorporated into the acrylic polymer.

The amount of crosslinking agent may be between about 0.1% by weight to about 10% by weight of the solids content of the total adhesive formulation, and in one embodiment may be between about 0.1% by weight and about 5% by weight of the solids content of the total adhesive formulation.

The formulation further comprises one or more polyol compounds. Any polyol may be used. In one embodiment, the polyol compound is a polyether polyol and in particular include polyethylene glycol and polypropylene glycol, for example. The polyol may have a weight average molecular weight between about 1,000 and about 10,000 g/mol. In another embodiment, the weight average molecular weight of the polyol is between about 2,000 to about 5,000 g/mol.

The polyol component is present as about 10% by weight to about 60% by weight of the total acrylic PSA component (i.e. that of both the monomer constituents and the solvent), and in some cases is about 20% by weight to about 50% by weight of the acrylic PSA component.

That is, adhesive formulations in accordance with exemplary embodiments, on a solids basis, are typically about 25% to about 90% by weight acrylic PSA component, about 0.1 to about 10% by weight cross-linking agent, and about 15% to about 75% by weight polyol component. In some embodiments, the acrylic PSA component is present as less than 50% by weight solids of the total adhesive formulation.

The pre-polymerized acrylic PSA component, the crosslinking agent and the polyol component are mixed together thoroughly in a solvent to form the adhesive formulation. The solvent may be, and usually is, a common solvent, such that the same solvent is used both to carry out the polymerization of the acrylic PSA component and for adding the additional constituents to form the adhesive formulation in accordance with the exemplary embodiments.

If desired for processing purposes, the viscosity of the formulation can be adjusted by adding or removing solvent. In some embodiments, it may also be desirable to provide an effective amount (typically up to about 10% by weight (solids)) of an anti-gelling additive to the composition, such as 2,4-pentanedione, particularly in embodiments which employ a metal chelate as a cross-linking agent. Other conventional additives used with other known acrylic PSA formulations for various purposes may also be employed.

The adhesive mixture can be coated on any suitable substrates including polyethylene terephthalate (PET) film, polyurethane film, and polyethylene film, by way of example only. In some embodiments, it may be desirable to surface-treat the film prior to application to enhance the anchorage between the adhesive and its substrate following crosslinking. Surface treatment may be accomplished by any suitable method, including corona discharge or priming, by way of example only. Where corona discharge is used as a surface treatment method, the adhesive formulation should be laminated to the treated film within about five minutes of the surface treatment to achieve better anchorage between the adhesive and the film.

The films to which the formulation is applied can then be subjected to a curing process, typically a thermal curing or drying process, to remove the solvent and to cross-link the formulation, thereby creating the adhesive in situ on the film (and/or the release liner). Although not wishing to be bound by theory, in embodiments in which metal chelates such as metal salts or organic titanates are used as crosslinking agents, the resulting cross-linked adhesive is believed to be a matrix in which the PSA component is cross-linked by metal chelation and in which the polyol floats within the matrix but is not chemically linked with the polymer chains of the PSA component. In any event, cured adhesive formulations in accordance with exemplary embodiments are characterized by being self-wetting and having a low peel strength.

A release liner, such as a silicone release liner, may then be laminated over the cured adhesive until the film is ready to be applied, at which point the release liner can be removed to expose the adhesive. Alternatively, the adhesive may be applied to the release liner first, and then be laminated to the film.

The film can then be adhered to display screens, for example, to assist in protecting the screens during and after the manufacture of the electronic devices in which the screens are employed. In embodiments in which the adhesive is used to adhere a protective film to display screens, the adhesive formulation is typically formulated to be transparent and preferably is optically clear. However, adhesive formulations in accordance with exemplary embodiments are not limited to being clear regardless of whether the formulations are used in conjunction with protective coverings for display screens or for any other purposes.

EXAMPLES

The invention is further described in the context of the following examples, which are presented by way of illustration, not of limitation.

PSA Component Formation (Examples 1-9)

Various acrylic PSA components were polymerized using each of 2-ethylhexyl acrylate (ranging between about 40 to about 70% by weight of total monomer weight), butyl acrylate (about 15 to about 25% by weight of total monomer weight), methyl acrylate (about 15 to about 30% by weight), vinyl pyrrolidone (about 1 to about 10% by weight of total monomer weight), and glycidyl methacrylate (about 0.1 to about 5% by weight of total monomer weight) in combination with acrylic acid (about 3 to about 10% by weight of total monomer weight) in ethyl acetate as a solvent. The polymerization was carried out by free radical polymerization using 2,2'-azobis(2-methylbutyronitrile) (available from DuPont as Vazo 67) as an initiator.

Example 1

One such PSA component was formed having the weight percentages reflected in Table 1 below and was further tested for use in subsequent examples. The PSA component was about 35% by weight solids (balance solvent) and had a viscosity of about 18,000 cps. The polymer had a glass transition temperature ($T_g$) of about −32° C.; the weight average molecular weight of the polymer was about 680,000 g/mol as determined by GPC.

TABLE 1

| Component | Weight Percent (Total Composition) | Relative Weight Percent (Solids Content) |
| --- | --- | --- |
| 2-ethylhexyl acrylate | 19.2 | 54.9 |
| methyl acrylate | 7 | 20 |
| butyl acrylate | 6.3 | 18 |
| acrylic acid | 1.9 | 5.4 |
| glycidyl methacrylate | 0.07 | 0.2 |
| vinyl pyrrolidone | 0.52 | 1.5 |
| Vazo 67 (initiator) | 0.05 | n/a |
| ethyl acetate (solvent) | 64.96 | n/a |

Example 2

1.2 parts by weight of aluminum acetylacetonate (Al(AcAc)$_3$) as a cross-linking agent and 5 parts by weight of 2,4-pentanedione as an anti-gelling agent were dissolved in 30 parts by weight of ethyl acetate. This solution was stirred for 10 minutes, after which it was added to 100 parts by weight of the acrylic PSA polymer solution created in Example 1. 30 parts by weight of polypropylene glycol having a molecular weight of 2000 g/mol (P2000 available from Dow Chemical) was also added to the solution and the mixture stirred for 30 minutes at room temperature.

Example 3

0.6 parts by weight of Al(AcAc)$_3$ and 2.5 parts by weight of 2,4-pentanedione were dissolved in 30 parts by weight of ethyl acetate. The solution was stirred for 10 minutes, and then added to 100 parts by weight of the PSA component polymer solution created in Example 1. 40 parts by weight of polypropylene glycol (P2000 available from Dow Chemical) was also added to the solution and stirred for 30 minutes at room temperature.

Example 4

The adhesive created according to Example 2 was coated on a silicone release liner and dried at 116° C. for 5 minutes and cured at 150° C. for 3 minutes. The dried adhesive layer was laminated on a corona treated surface of an 8 mil (0.008 inch) optically clear polyurethane film.

Example 5

The adhesive created according to Example 3 was direct coated on a corona treated surface of a 2 mil (0.002 inch) PET film. The adhesive was dried at 116° C. for 5 minutes and cured at 150° C. for 3 minutes. A silicone release liner was then laminated on the surface of the dried adhesive.

The peel strength of the adhesive formulation was tested using the films formed in Examples 4 and 5, which were analyzed on glass in accordance with the ASTM 3300 peel testing test. Example 4 exhibited a peel strength of about 1 oz/in and good self-wetting characteristics. Example 5 had a higher peel strength and faster self-wetting than Example 4, exhibiting a peel strength of about 3 to about 4 oz/in.

Example 6

2.8 parts by weight of Tyzor GBA (from Dupont) and 12 parts by weight of 2,4-pentanedione were dissolved in 30 parts by weight of ethyl acetate. This solution was stirred for 10 minutes, after which it was added to 100 parts by weight of the PSA component polymer solution created in Example 1. 40 parts by weight of polypropylene glycol (P2000 available from Dow Chemical) was also added the solution and the mixture stirred for 30 minutes at room temperature.

Example 7

4.2 parts by weight of (3-Glycidoxypropyl)trimethoxysilane (SIG5840.0 from Gelest) and 30 parts by weight of ethyl acetate were added to 100 parts by weight of the acrylic PSA polymer solution created in Example 1. 40 parts by weight of polypropylene glycol (P2000 available from Dow Chemical) was also added to the solution and the mixture stirred for 30 minutes at room temperature.

Example 8

4.2 parts by weight of (3-Glycidoxypropyl)trimethoxysilane (SIG5840.0 from Gelest) and 30 parts by weight of ethyl acetate were added to 100 parts by weight of the acrylic PSA polymer solution created in Example 1. 30 parts by weight of polypropylene glycol (P2000 available from Dow Chemical) was also added to the solution and the mixture stirred for 30 minutes at room temperature.

Example 9

4.2 parts by weight of the epoxy-functional compound Erisys GE22, a cyclohexanedimethanol diglycidyl ether obtained from CVC Specialty Chemicals and 30 parts by weight of ethyl acetate were added to 100 parts by weight of the acrylic PSA polymer solution created in Example 1. 40 parts by weight of polypropylene glycol (P2000 available from Dow Chemical) was also added to the solution and the mixture stirred for 30 minutes at room temperature.

The formulations of Examples 6, 7, 8 and 9 were each direct coated on a corona treated surface of a 1 mil (0.001 inch) PET film. The adhesive was dried at 116° C. for 5 minutes and cured at 150° C. for 3 minutes. A silicone release liner was then laminated on the surface of the dried adhesive.

The peel strength of the films formed from Examples 6, 7, 8 and 9 were analyzed on glass in accordance with the ASTM 3300 peel testing test and all yielded a peel strength of less than 1.5 oz/in. The adhesive formulation from Example 6 exhibited a peel strength of about 0.5 oz/in, while that of each of Examples 7 and 8 exhibited a peel strength of about 0.8 oz/in; the adhesive of Example 9 had a peel strength of about 1 oz/in. All of Examples 6 through 9 exhibited good self-wetting characteristics.

Example 10

A non-acid containing acrylic PSA was polymerized using each of the monomers 2-ethylhexyl acrylate (85% wt. relative to total monomer content) and glycidyl methacrylate (15% wt. relative to total monomer content) in ethyl acetate as a solvent to form a solution having 40 percent by weight solids. The polymerization was carried out by free radical polymerization using Vazo 67 as an initiator.

Example 11

To 100 parts of the polymer solution of Example 10, 5.7 parts by weight of a difunctional amine (D-400 obtained from Huntsman Corporation) having a molecular weight of 430 g/mol, and 20 parts by weight of polypropylene glycol (P2000 available from Dow Chemical) were added and the mixture stirred for 5 minutes at room temperature.

Example 12

To 100 parts of the polymer solution of Example 10, 3.9 parts by weight of a trifunctional amine (T-403, also obtained from Huntsman Corporation) having a molecular weight of 440 g/mol, and 20 parts by weight of polypropylene glycol (P2000 available from Dow Chemical) were added and the mixture stirred for 5 minutes at room temperature.

Example 13

The adhesive created according to Example 11 was direct coated on the surface of a 2 mil (0.002 inch) PET film. The adhesive was dried at 116° C. for 5 minutes and then cured at 150° C. for 3 minutes. Then a silicon release liner was laminated on the surface of the dried adhesive.

Example 14

The adhesive created according to Example 12 was direct coated on the surface of a 2 mil (0.002 inch) PET film. The adhesive was dried at 116° C. for 5 minutes and then cured at 150° C. for 3 minutes. Then a silicon release liner was laminated on the surface of the dried adhesive.

Peel tests were conducted for the films created in Examples 13 and 14 in accordance with ASTM 3300 peel testing. Both exhibited peel strengths of less than 1.0 oz/in on both glass and stainless steel substrates and also exhibited good self-wetting characteristics.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An adhesive formulation comprising:
   a pre-polymerized cross-linkable acrylic based pressure sensitive adhesive in a non-aqueous solvent, wherein the acrylic based pressure sensitive adhesive does not incorporate an acid;
   a cross-linking agent selected from the group consisting of multifunctional amines, alkyl halide compounds, multifunctional acids, multifunctional mercaptans, multifunctional epoxy compounds, and combinations thereof; and
   a polyol having a weight average molecular weight in the range from 1,000 g/mol to 10,000 g/mol,
   wherein the adhesive formulation, when cured, is self-wetting and has a peel strength less than 20 oz/in on glass.

2. The adhesive formulation of claim 1, wherein the formulation is less than 50% by weight (solids) of the acrylic pressure sensitive adhesive.

3. The adhesive formulation of claim 1, wherein the formulation is in the range of about 0.1% by weight (solids) to about 10% by weight (solids) of the cross-linking agent.

4. The adhesive formulation of claim 1, further comprising an effective amount of an anti-gelling agent.

5. The adhesive formulation of claim 1, wherein the acrylic based pressure sensitive adhesive is a copolymer.

6. The adhesive formulation of claim 5, wherein the copolymer is produced from at least one co-monomer from a first group consisting of hydroxylethyl acrylate, hydroxylethyl methacrylate, and glycidyl methacrylate and at least one co-monomer from a second group consisting of 2-ethylhexyl (meth)acrylate, butyl (meth)acrylate, ethyl (meth)acrylate, methyl (meth)acrylate, isooctyl (meth)acrylate, vinyl acetate, and vinyl pyrrolidone.

7. The adhesive formulation of claim 1, wherein the polyol is a polyether polyol.

8. The adhesive formulation of claim 7, wherein the polyether polyol is polyethylene glycol or polypropylene glycol.

9. The adhesive formulation of claim 1, wherein the pressure sensitive adhesive has functional groups selected from the group consisting of hydroxyl, epoxy, and combinations thereof.

10. The adhesive formulation of claim 1, wherein the formulation excludes isocyanate.

11. The adhesive formulation of claim 1, wherein the adhesive formulation, when cured, has a peel strength less than about 10 oz/in on glass.

12. A protective film for an optical display screen comprising:
    a polymeric film coated with the adhesive formulation of claim 1.

13. The film of claim 12, wherein the adhesive formulation is optically clear.

14. An adhesive formulation comprising:
a pre-polymerized cross-linkable acrylic based pressure sensitive adhesive in a non-aqueous solvent, wherein the pressure sensitive adhesive is an epoxy-functional acrylic polymer;
a multifunctional amine crosslinking agent; and
polypropylene glycol having a weight average molecular weight in the range from 1,000 g/mol to 10,000 g/mol,
wherein the adhesive formulation when cured, is self-wetting and has a peel strength less than about 10 oz/in on glass.

15. The adhesive formulation of claim 14, wherein the polypropylene glycol has a molecular weight in the range of about 2,000 g/mol.

16. The adhesive formulation of claim 14, wherein the adhesive formulation, when cured, has a peel strength less than about 4 oz/in on glass.

17. The adhesive formulation of claim 8, wherein the polyether polyol is polypropylene glycol.

* * * * *